United States Patent
Kuivalainen et al.

(10) Patent No.: US 7,538,508 B2
(45) Date of Patent: May 26, 2009

(54) THERMAL OVERLOAD PROTECTION

(75) Inventors: Janne Kuivalainen, Vaasa (FI); Peter Österback, Vaasa (FI)

(73) Assignee: ABB Oy, Helsinki (FI)

( * ) Notice: Subject to any disclaimer, the term of this patent is extended or adjusted under 35 U.S.C. 154(b) by 416 days.

(21) Appl. No.: 10/588,300

(22) PCT Filed: Feb. 1, 2005

(86) PCT No.: PCT/FI2005/000067

§ 371 (c)(1),
(2), (4) Date: Oct. 2, 2006

(87) PCT Pub. No.: WO2005/074089

PCT Pub. Date: Aug. 11, 2005

(65) Prior Publication Data

US 2008/0253041 A1 Oct. 16, 2008

(30) Foreign Application Priority Data

Feb. 2, 2004 (FI) .................................. 20040155

(51) Int. Cl.
*H02P 1/04* (2006.01)
*H02P 3/00* (2006.01)

(52) U.S. Cl. .................. 318/471; 318/634; 318/782; 318/783; 361/25; 361/31; 361/106

(58) Field of Classification Search ............ 318/471, 318/634, 782, 783; 361/25, 31, 106
See application file for complete search history.

(56) References Cited

U.S. PATENT DOCUMENTS

| 4,717,984 | A | | 1/1988 | Henry et al. |
| 5,644,510 | A | * | 7/1997 | Weir .......................... 702/132 |
| 6,252,365 | B1 | * | 6/2001 | Morris et al. ............... 318/455 |
| 6,563,685 | B2 | * | 5/2003 | Gotzig ....................... 361/187 |
| 7,019,951 | B2 | * | 3/2006 | Plemmons et al. ........... 361/24 |
| 2007/0121259 | A1 | * | 5/2007 | Kuivalainen et al. .......... 361/25 |

FOREIGN PATENT DOCUMENTS

EP     0 869 597 A1    10/1998
WO   WO 01/24340 A1    4/2001

OTHER PUBLICATIONS

Steven W. Smith—The Scientist and Engineer's Guide to Digital Signal Processing; Chapter 78, pp. 503-534 Dec. 28, 2001.

* cited by examiner

*Primary Examiner*—Paul Ip
(74) *Attorney, Agent, or Firm*—Buchanan Ingersoll & Rooney PC

(57) ABSTRACT

A thermal overload protection for an electrical device, particularly an electric motor (M), measures a load current supplied to the electrical device (M), and calculates the thermal load on the electrical device on the basis of the measured load current, and shuts off (S2) a current supply (L1, L2, L3) when the thermal load reaches a given threshold level. The protection comprises a processor system employing X-bit, preferably X=32, fixed-point arithmetic, wherein the thermal load is calculated by a mathematic equation programmed into the microprocessor system structured such that a result or a provisional result never exceeds the X-bit value.

20 Claims, 2 Drawing Sheets

THERMAL OVERLOAD PROTECTION

BACKGROUND OF THE INVENTION

The invention relates to thermal overload protection for protecting electrical devices, and particularly electric motors, from overheating.

Electric motors are utilized in several applications for driving various moving parts. An electric motor often has an associated control unit for adjusting and monitoring the operation of the electric motor, the speed of rotation, for example.

An electric motor may temporarily operate also overloaded, but if it becomes overheated as the loading continues, this may result in damage to the motor. Damage to the isolation of the stator coiling caused by overheating is the most critical.

Various solutions are known for protecting an electric motor against thermal overload. One known solution is based on 1 . . . 3-phase measurement of the motor current and on modelling the heating of the motor by using an RC equivalent circuit. The oldest and most common technical implementation is a bimetallic relay (thermal relay) coupled directly or via a current transformer to the main circuit.

A known solution is a thermal safety switch arranged inside or in connection with the motor, the switch tripping after a given temperature limit and interrupting the current flow through the electric motor. A more advanced version is an electronic unit that measures the temperature of the electric motor with temperature sensors and triggers a shut-off of the motor. This alternative manner is directly based on temperature detection with various sensors. The problem is the difficulty of placing the sensors correctly. Such a protection reacts relatively slowly.

In numerical protection, data is processed in a numeric format, i.e. digitally. Analogical measurement data are converted with an A/D converter into digital. The actual measurement and protection functions are implemented by means of a microprocessor. The thermal overload protection measures the root mean square (rms) values of the phase currents (load currents) of a motor or another object to be protected (e.g. a cable or a transformer), and calculates the temperature-dependent operating time. This thermal operating time may be accordant with standard IEC 60255-8:

$$t = \tau \ln \frac{I^2 - I_p^2}{I^2 - I_b^2}$$

wherein
t=operating time
τ=time constant
$I_p$=load current before overload
I=load current
$I_b$=operating current (maximum allowed continuous current)

The thermal time constant τ is determined as the time required of the object to be protected to reach a temperature θ, which is a given portion (e.g. 63%) of a steady-state temperature $θ_s$, when the object to be protected is supplied with constant current. The operating current $I_p$ is the highest allowed continuous current, which also corresponds to the highest allowed temperature, i.e. the steady-state temperature $θ_s$. This highest allowed temperature is the trip level. Alternatively, the relative value of the thermal load on the object to be protected relative to a full (100%) thermal load can be calculated from the phase currents. The trip occurs when the relative thermal load reaches a 100% value.

Numeric thermal protection is thus associated with heavy calculation requiring an efficient processor and fast and expensive peripheral circuits, such as memories. Prior art solutions have employed an efficient processor having also an in-built mathematics processor, a floating point unit (FPU) or a corresponding unit for performing real-time calculation within a determined time. An efficient processor having library functions emulating a floating-point number unit has also been used. Implementations also exist wherein the algorithm is implemented with ASIC circuits, whereby they cannot be reprogrammed afterwards. Consequently, changes cannot be made to such a single-purpose circuit, but a new circuit is always required if the operation is to be changed. Implementations also exist wherein the current is measured/calculated, the warming-up is calculated, measurements are repeated etc., in a sequence. Such an implementation does not ensure fully real-time protection (no continuous measurement), but enables the use of a less efficient processor.

BRIEF DESCRIPTION OF THE INVENTION

The object of the invention is thus to provide a method for thermal protection of electrical devices and an apparatus for implementing the method, allowing the calculation associated with the protection to be lightened and the technical requirements of the processors and peripheral circuits to be lowered. The object of the invention is achieved with a method and system that are characterized in what is stated in the independent claims. Preferred embodiments of the invention are described in the dependent claims.

The invention is based on programming a mathematical equation or algorithm and its operands that calculate the thermal load such that they are suitable for an X-bit, preferably X=32, processor system employing fixed-point arithmetic in such a manner that the result or provisional result never exceed the X-bit value when the program is run in the processor system. The measured current is preferably scaled into a unit value to a range of 0 to Y, wherein Y represents Y/100% of the nominal current, and preferably Y=65000, whereby the calculation is independent of the actual current range.

The invention enables the calculation of the thermal load with a less efficient processor and less memory, which, in turn, lower the power consumption, production costs and physical size of the device. The calculation can be implemented with a simple and transferable code, which does not require a mathematics processor or mathematical libraries. However, the thermal load can be calculated with nearly the accuracy of a 64-bit floating-point number calculation, even if the processor used 32-bit fixed-point arithmetic.

BRIEF DESCRIPTION OF THE FIGURES

In the following, the invention will be described in more detail in connection with preferred embodiments with reference to the accompanying drawings, in which.

DETAILED DESCRIPTION OF THE INVENTION

Figure 1:
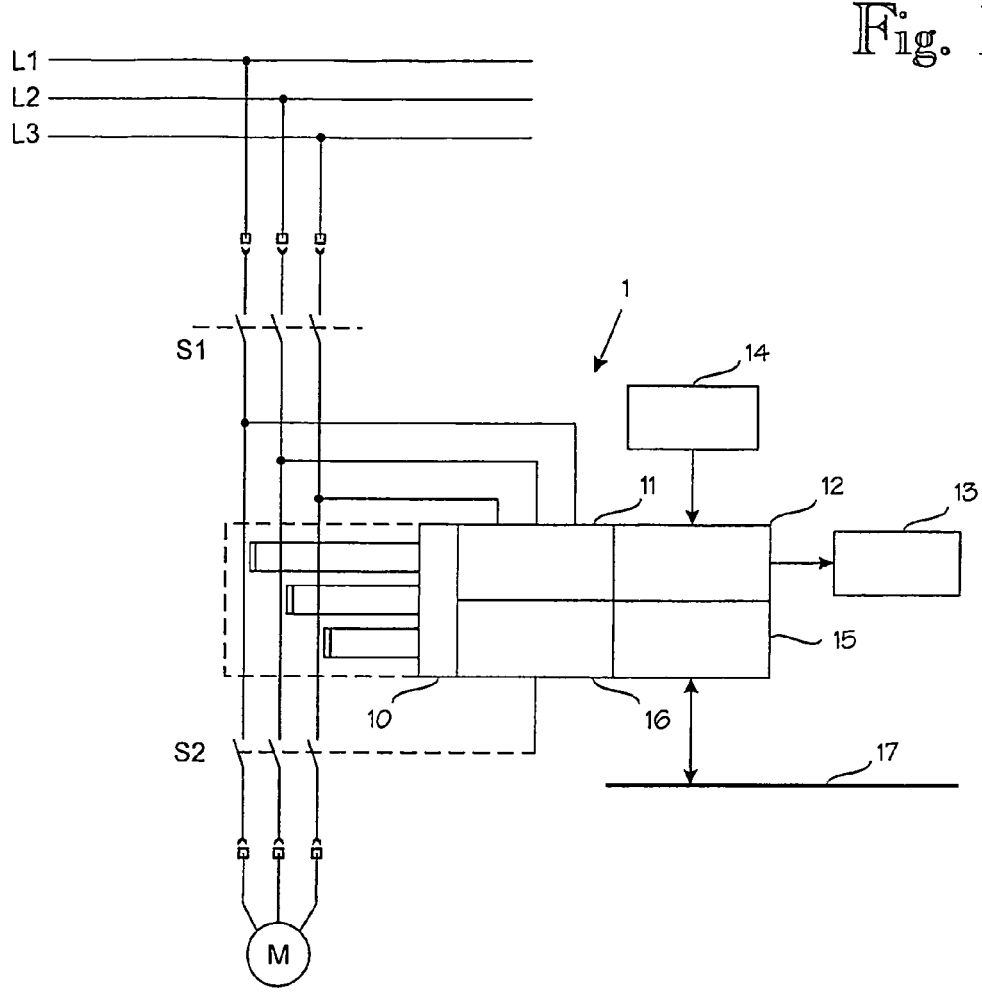
FIG. 1 is an exemplary block diagram illustrating the overload protection according to an embodiment of the invention.

In FIG. 1, a thermal overload protection is coupled between an electric motor M or other electrical device to be protected and a three-phase mains current supply L1, L2 and L3. S1 is a main mains switch, e.g. manually controlled, and S2 is a release switch controlled by the overload protection and controlled with a trip signal TRIP. The overload protection 1 measures the current load of each phase L1, L2 and L3 of the mains current supply of the motor M with a current measurement unit 10, which is based on current transformers, for example. In addition, the overload protection 1 may comprise a measuring unit 11 for measuring phase voltages. Further, the overload protection 1 preferably comprises a user interface, i.e. a human-machine-interface (HMI) 12, with a display 13 and a keyboard 14. Furthermore, the overload protection 1 may comprise a data communication unit 15 connected to a local area network (e.g. Ethernet), a bus, a field bus (e.g. Profibus DP) or another data communication medium 17.

As regards the invention, the most essential function is related to the protection and control unit 16. The overload protection 1 is implemented with a microprocessor system, the majority of the above units being implemented with suitable microprocessor software and peripheral circuits, such as memory circuits. The measuring values provided by the current and voltage-measuring units are converted into numerical, i.e. digital values with digital/analog converters (A/D). In accordance with the basic principle of the invention, the microprocessor system employs fixed-point arithmetic, preferably 32-bit arithmetic. A suitable processor type is for instance a general-purpose processor having a 32-bit RISC instruction set, such as ARM7/9 or the M68k series.

It is to be appreciated that the above-described structure is only one example of a thermal overload protection for implementing the invention.

The overload protection 1 protects the motor M from overheating and from any damage caused thereby. The protection is based on calculating the thermal load on the motor on the basis of measured phase currents. In the following, the general operation of the protection will be explained by means of the example of FIGS. 2 and 3. Phase conductors L1, L2 and L3 are connected to the motor M by closing switches S1 and S2. The current-measuring unit 10 measures the currents of the phases (step 31, FIG. 3), and the control unit 16 calculates the thermal load on the motor M on the basis of the phase currents by using fixed-point arithmetic (step 32). The mathematical equation used in the calculation of the thermal load for one phase may be as follows:

$$\Theta_k = \Delta T * \frac{i^2}{C} + \left(1 - \frac{\Delta T}{R*C}\right) * \Theta_{k-1}$$

wherein

Σ=thermal load, preferably 0 to 200% preferably corresponding to a value range of 0 to 2.4

ΔT=interval for thermal load calculation, preferably in milliseconds

R=cooling factor of electrical device, preferably 1 to 10

C=trip-class factor i=measured load current

Factor C is preferably a trip-class factor $t_6$, which indicates the longest starting time set on the motor relative to the actual starting time of the motor. Factor C may be for instance 1.7 (×actual starting time). In a primary embodiment of the invention, the trip-class factor $t_6$ is multiplied by a constant, preferably 29.5, or calculated by the formula $(1/k)*Te*(Ia/In)^2$, wherein Ia=starting current, In=nominal current, Te=allowed starting time, and k=constant. Constant k=1.22 when an operating time graph corresponding to that of a combination of trip class and $t_6$-time is desired (operating times according to the requirements of IEC 60947-4-1). The measured current is preferably scaled into a unit value to a range of 0 to Y, wherein Y represents Y/100% of the nominal current, and preferably Y=65000, whereby the calculation is independent of the actual current range.

Let us examine 32-bit fixed-point arithmetic by way of example. In accordance with the invention, the above-described mathematical equation or algorithm and its operands that calculate the thermal load are programmed suitable for a processor system employing 32-bit fixed-point arithmetic in such a manner that the result or the provisional result never exceed the 32-bit value when the program is run in the processor system.

The following is an example of a calculation equation structured and scaled in this manner thRes=((ΔT*(i²/C)+ROUNDING)/MSEC)+ (((((MSEC*SCALING)−((ΔT*SCALING)/ (R*C)))/SPART1)*th)/SPART2)+thFract wherein the operand values are for example as follows thRes=thermal load 0 to 200% corresponding to value range 0 to 24000

ROUNDING=e.g. 500

MSEC=e.g. 1000

SCALING=e.g. 10000

SPART1=e.g. SCALING/10

SPART2=e.g. SCALING/100 thFract=thRes of previous calculation divided by constant, e.g. constant =SCALING =10000.

ROUNDING corresponds to decimal rounding. MSEC scales milliseconds into seconds. SCALING is accuracy scaling. The product of terms SPART1 and SPART2 represents the scaling of a time unit (preferably milliseconds), split into two parts to maintain calculation accuracy.

The result of the thermal load, thRes, is too high because of the scaling (in the example, within the range 0 to 24000), and it is scaled down to represent the thermal load per unit value employed, in the example to the range 0 to 2.4

Σ=thRES/10000

This quotient Σ is saved as parameter thFract and employed in the calculation the next time. Calculation accuracy on 0 to 100% thermal load is better than 0.1% of the thermal load.

Figure 2:
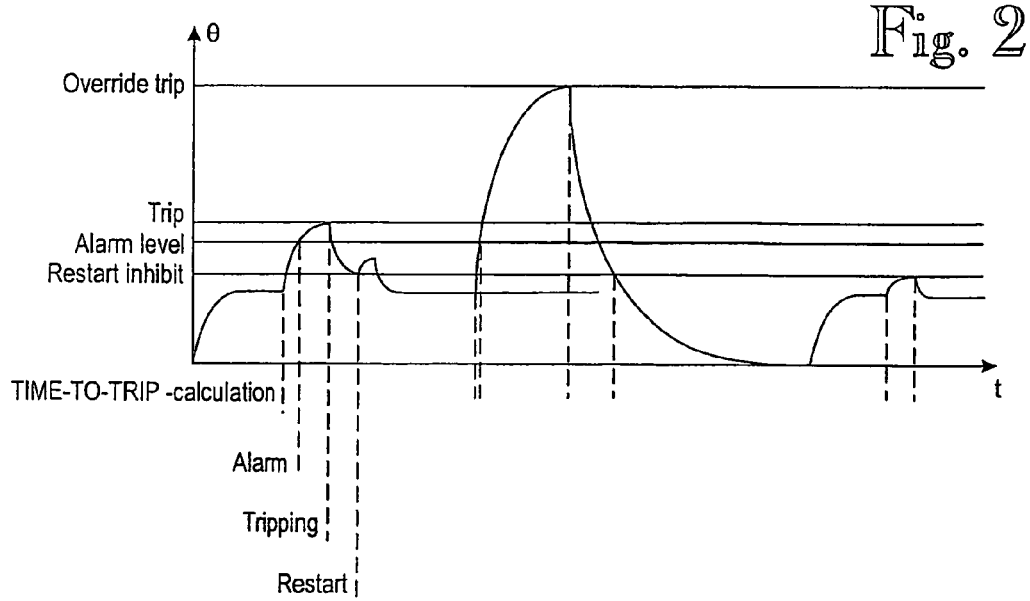
FIG. 2 is an exemplary signal diagram illustrating the operation of the device of FIG. 1.
Figure 3:
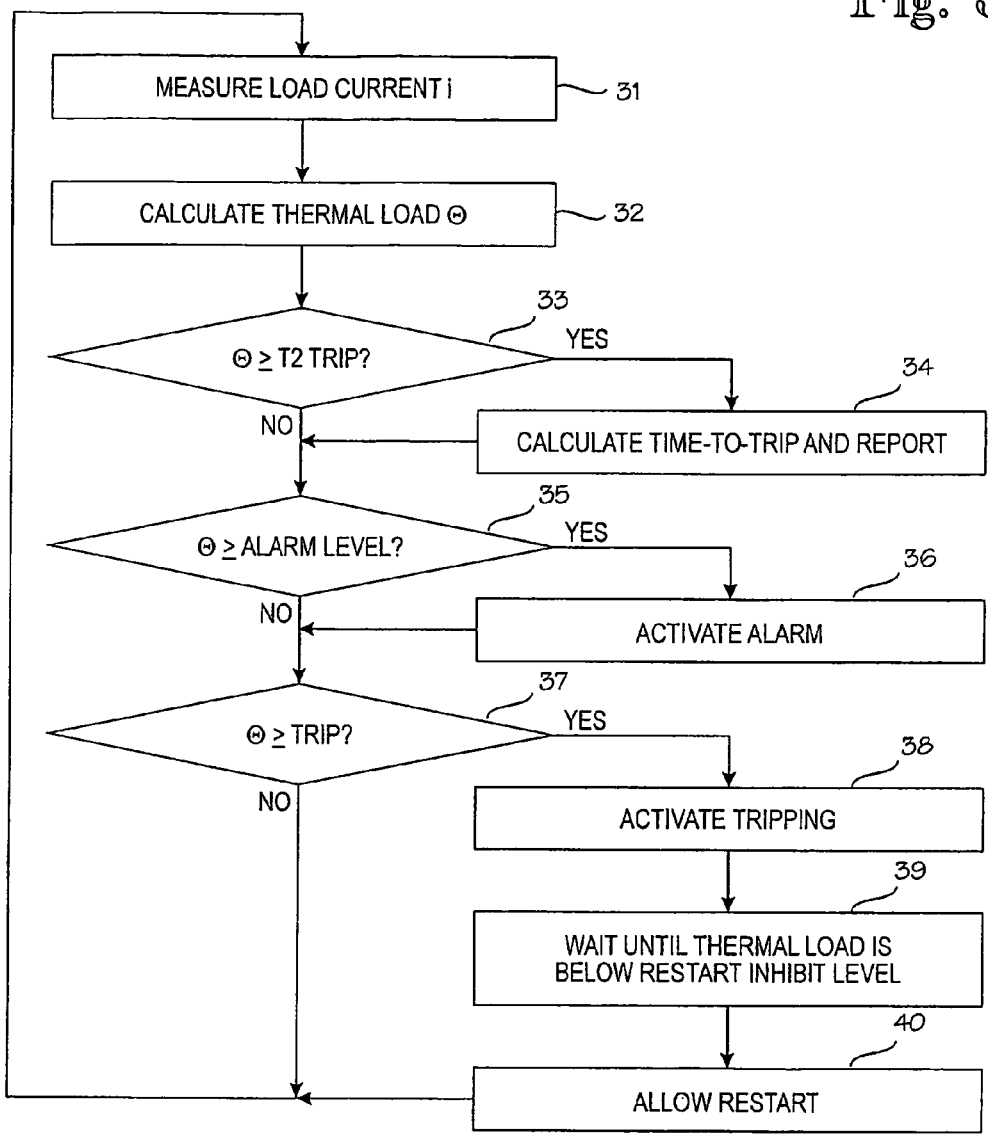
FIG. 3 is an exemplary flow diagram illustrating the operation of the device of FIG. 1.

The graph of FIG. 2 represents the calculated thermal load Σ as a function of time t. When the motor M is started from cold state, it begins to warm up. In the same way, the calculated thermal load Σ increases as a function of time. When the thermal load Σ increases to a given set alarm level Alarm_level, the control unit 16 may give an alarm to the operator for instance via the user interface 12-14 or the communication unit 15 (steps 35 and 36 in FIG. 3). The control unit 16 may also continuously or after a given level calculate the remaining time to trip (time-to-trip) and communicate it to the operator (steps 33 and 34 in FIG. 3). When the thermal load Σ increases to a given set trip level Trip (preferably 100% of the thermal load on the motor), the control unit 16 activates a trip signal TRIP, which controls the switch S2 to open, whereby the motor M is disconnected from the three-phase supply L1, L2 and L3 (steps 37 and 38 in FIG. 3). If the thermal capacity of the motor remaining after the tripping is too low (e.g. less than 60%), the protection 1 may prevent a restart until the motor is cooled to a given level (restart inhibit) or for a given time (steps 39 and 40 in FIG. 3). For start-up, signal TRIP is again connected inactive and switch S2 is closed. In an embodiment, the operator may control the control unit 16 into an override state, wherein the Trip level is double (override Trip level).

It is obvious to a person skilled in the art that as technology advances, the basic idea of the invention can be implemented in a variety of ways. Consequently, the invention and its embodiments are not restricted to the above examples, but can vary within the scope of the claims.

The invention claimed is:

1. A device for thermal overload protection of an electrical device, particularly an electric motor (M), the device comprising means for measuring at least one load current supplied to the electrical device (M), means for calculating the thermal load on the electrical device on the basis of said at least one load current, and means (S2) for interrupting a current supply (L1, L2, L3) when the thermal load reaches a given threshold level, wherein the device comprises a processor system employing X-bit, fixed-point arithmetic, the system comprising means for scaling the current measured into unit values to a range of 0 to Y, wherein Y represents Y/100% of a nominal current, and means for calculating a time-to-trip, in accordance with formula $$\tau = R * C * \ln(a)$$
$$a = 1 - \left(\frac{\Theta_{trip} - \Theta}{i^2 - \Theta}\right)$$

wherein
$\Theta_{trip}$=trip level for thermal load
$\Theta$=calculated thermal load
$\tau$=estimated time to moment when $\Theta$ reaches trip level $\Theta_{trip}$
$\Delta T$=interval for thermal load calculation
R=cooling factor of electrical device
C=trip-class factor
i=measured current
whereby the equation and its operands are programmed into the microprocessor system structured such that a result or a provisional result never exceeds the X-bit value.

2. A device as claimed in claim 1, wherein one or more following operand values are used $\Theta$=0 to 200% preferably corresponding to a value range of 0 to 2.4$\Delta T$=interval for thermal load calculation in milliseconds R=cooling factor of electrical device in a range of 1 to 10.

3. A device as claimed in claim 2, wherein the mathematical equation that, together with its operands, is structured such that the result or the provisional result of the calculation of the thermal load never exceeds the 32-bit value is $$a=1*e10\_SCALING-(\Theta_{trip}-\Theta)*e10\_SCALING/(i2/PUCOMP-\Theta))$$

$$\tau=(R*C*(\log(a)*SCALING-(LN\_e10*SCALING)))/-SCALING$$

wherein
e10_SCALING is scaling factor for function $e^{10}$
LN_e10 represents function $\ln(e^{10})$
i=measured current scaled into unit value
SCALING is accuracy scaling whose value depends on the required accuracy
PUCOMP is per-unit compensation.

4. A device as claimed in claim 3, wherein the device comprises a memory wherein a look-up table is stored including values of function ln(a) for a set of values of parameter a, and that said calculation means are arranged to retrieve a value corresponding to parameter a from the look-up table during the calculation of the equation.

5. A device as claimed in claim 4, wherein C is trip-class factor $t_6$ multiplied by a constant, preferably 29.5, or calculated by the formula $(1/k)*Te*(Ia/In)^2$, wherein Ia=starting current, In=nominal current, Te=allowed starting time and k=constant, preferably k=1.22.

6. A device as claimed in claim 1, wherein the mathematical equation that, together with its operands, is structured such that the result or the provisional result of the calculation of the thermal load never exceeds the 32-bit value is $$a=1*e10\_SCALING-(\Theta_{trip}-\Theta)*e10\_SCALING/(i2/PUCOMP-\Theta))$$

$$\tau=(R*C*(\log(a)*SCALING-(LN\_e10*SCALING)))/-SCALING$$

wherein
e10_SCALING is scaling factor for function $e^{10}$
LN_e10 represents function $\ln(e^{10})$
i=measured current scaled into unit value
SCALING is accuracy scaling whose value depends on the required accuracy
PUCOMP is per-unit compensation.

7. A device as claimed in claim 6, wherein one or more following operand values are used
e10_SCALING=22026
LN_e10=10
i=measured current scaled into unit value to range 0 to 65000
corresponding to 0 to 650% of the nominal current,
SCALING=10000
PUCOMP=10000.

8. A device as claimed in claim 7, wherein the device comprises a memory wherein a look-up table is stored including values of function ln(a) for a set of values of parameter a, and that said calculation means are arranged to retrieve a value corresponding to parameter a from the look-up table during the calculation of the equation.

9. A device as claimed in claim 7, wherein C is trip-class factor $t_6$ multiplied by a constant, preferably 29.5, or calculated by the formula $(1/k)*Te*(Ia/In)^2$, wherein Ia=starting current, In=nominal current, Te=allowed starting time and k=constant, preferably k=1.22.

10. A device as claimed in claim 1, wherein the device comprises a memory wherein a look-up table is stored including values of function ln(a) for a set of values of parameter a, and that said calculation means are arranged to retrieve a value corresponding to parameter a from the look-up table during the calculation of the equation.

11. A device as claimed in claim 1, wherein C is trip-class factor $t_6$ multiplied by a constant, preferably 29.5, or calculated by the formula $(1/k)*Te*(Ia/In)^2$, wherein Ia=starting current, In=nominal current, Te=allowed starting time and k=constant, preferably k=1.22.

12. A method for thermal overload protection of an electrical device, particularly an electric motor, the method comprising measuring at least one load current supplied to the electrical device, calculating the thermal load on the electrical device on the basis of said at least one load current, interrupting current supply to the electrical device when the thermal load reaches a given threshold level, scaling the measured current into a unit value to a range of 0 to Y, wherein Y represents Y/100% of a nominal current, and calculating the time-to-trip using an X-bit, processor system employing fixed-point arithmetic, by solving the following equation structured and scaled such that a result or a provisional result never exceeds the X-bit value:

$$\tau = R * C * \ln(a)$$
$$a = 1 - \left(\frac{\Theta_{trip} - \Theta}{i^2 - \Theta}\right)$$

wherein
$\Theta_{trip}$=trip level for thermal load
$\Theta$=calculated thermal load
$\tau$=estimated time to moment when $\Theta$ reaches trip level $\Theta_{trip}$
$\Delta T$=interval for thermal load calculation
R=cooling factor of electrical device
C=trip-class factor
i=measured current whereby the equation and its operands are structured such that a result or a provisional result never exceeds the X-bit value.

13. A method as claimed in claim 12, comprising: using one or more of the following operand values
$\Theta$=calculated thermal load 0 to 200% preferably corresponding to a
value range of 0 to 2.4
$\Delta T$=interval for thermal load calculation in milliseconds
R=cooling factor of electrical device in a range of 1 to 10.

14. A method as claimed in claim 13, wherein the mathematical equation that, together with its operands, is structured such that the result or the provisional result of the calculation of the thermal load never exceeds the 32-bit value being $$a=1*e10\_SCALING-(\Theta_{trip}-\Theta)*e10\_SCALING/(i2/PUCOMP-\Theta))$$

$$\tau=(R*C*(\log(a)*SCALING-(LN\_e10*SCALING)))/-SCALING$$

wherein
e10_SCALING is scaling factor for function $e^{10}$
LN_e10 represents function $\ln(e^{10})$
i=measured current scaled into unit value
SCALING is accuracy scaling whose value depends on the required accuracy
PUCOMP is per-unit compensation.

15. A method as claimed in any one of claims claim 14, comprising:
storing a look-up table including values of function ln(a) for a set of values of parameter a, and
retrieving a value corresponding to parameter a from the look-up table during the calculation.

16. A method as claimed in claim 12, wherein the mathematical equation that, together with its operands, is structured such that the result or the provisional result of the calculation of the thermal load never exceeds the 32-bit value being $$a=1*e10\_SCALING-(\Theta_{trip}-\Theta)*e10\_SCALING/(i2/PUCOMP-\Theta))$$

$$\tau=(R*C*(\log(a)*SCALING-(LN\_e10*SCALING)))/-SCALING$$

wherein
e10_SCALING is scaling factor for function $e^{10}$
LN_e10 represents function $\ln(e^{10})$
i=measured current scaled into unit value
SCALING is accuracy scaling whose value depends on the required accuracy
PUCOMP is per-unit compensation.

17. A method as claimed in claim 16, comprising: using one or more of the following operand values
e10_SCALING=22026
LN_e10=10
i=measured current scaled into unit value to range 0 to 65000 corresponding to 0 to 650% of the nominal current,
SCALING=10000
PUCOMP=10000.

18. A method as claimed in claim 12, comprising:
storing a look-up table including values of function ln(a) for a set of values of parameter a, and
retrieving a value corresponding to parameter a from the look-up table during the calculation.

19. A method as claimed in claim 12, wherein C being trip-class factor $t^6$ multiplied by a constant, preferably 29.5, or calculated by the formula $(1/k)*Te*(Ia/In)^2$, wherein Ia=starting current, In=nominal current, Te=allowed starting time and k=constant, preferably k=1.22.

20. A method as claimed in claim 12, wherein C being trip-class factor $t_6$ multiplied by a constant, preferably 29.5, or calculated by the formula $(1/k)* Te*(Ia/In)^2$, wherein Ia=starting current, In=nominal current, Te=allowed starting time and k=constant, preferably k=1.22.

* * * * *